(12) United States Patent
Nakazawa et al.

(10) Patent No.: US 7,106,308 B2
(45) Date of Patent: Sep. 12, 2006

(54) INPUT DEVICE AND ELECTRONIC DEVICE

(75) Inventors: Mitsuaki Nakazawa, Shinagawa (JP); Takashi Nakajima, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 230 days.

(21) Appl. No.: 10/277,095

(22) Filed: Oct. 22, 2002

(65) Prior Publication Data

US 2003/0179188 A1    Sep. 25, 2003

(30) Foreign Application Priority Data

Mar. 22, 2002    (JP) .............................. 2002-081588

(51) Int. Cl.
*G09G 5/00*    (2006.01)
(52) U.S. Cl. .................... 345/173; 178/18.01
(58) Field of Classification Search ................ 345/173, 345/174; 178/18.01–18.03
See application file for complete search history.

(56) References Cited

U.S. PATENT DOCUMENTS 5,432,304 A * 7/1995 Tanahashi ................ 178/18.02
5,606,346 A * 2/1997 Kai et al. .................... 345/173
6,639,585 B1 * 10/2003 Nagai et al. ................ 345/173

FOREIGN PATENT DOCUMENTS

| JP | 63-308630 | 12/1988 |
| JP | 5-150890 | 6/1993 |
| JP | 9-160722 | 6/1997 |
| JP | 2000-173384 | 6/2000 |
| JP | 2001-154802 | 6/2001 |

* cited by examiner

Primary Examiner—Jimmy H. Nguyen
(74) Attorney, Agent, or Firm—Staas & Halsey LLP

(57) ABSTRACT

Relating to input devices and electronic devices generating a signal corresponding to a position depressed on their input domain, an input device and an electronic device are capable of performing an easy correction. The input device generates the signal corresponding to the position depressed on its input domain, and contains a correction domain and a correction unit. The correction domains are set in several positions in a periphery of and different from the input domain. Based on the signal corresponding to the position depressed on the correction domain, the correction unit corrects the signal corresponding to the position depressed on the input domain.

5 Claims, 10 Drawing Sheets

INPUT DEVICE AND ELECTRONIC DEVICE

BACKGROUND OF THE INVENTION

1. Field of the Invention

The present invention relates to input devices and electronic devices, more particularly, to an input device and an electronic device that generate a signal corresponding to a position depressed on their input domains.

Recently, the expanding market for information communication apparatuses and terminal units in business use has rapidly increased the demand for touch panels. A touch panel is incorporated suitably in a small apparatus such as a PDA (personal digital assistant), because it is arranged in a stack together with a display device and can be satisfactorily operated on the display device. Among types of touch panels, there has been a stronger demand for a resistance film type touch panel, which is capable of controlling and operating easily not only PDAs but also office computers and personal computers. Normally, a touch panel is arranged on the surface of a display device, and is incorporated so that it can operate together with what is projected on the display device. Here, it is required that relative positions of the touch panel and the display device be accurately aligned. Thus, correcting an input coordinate of the touch panel on the basis of the relative position of the touch panel to the display device, that is, calibration, is usually carried out.

2. Description of the Related Art

FIG. 1 illustrates a structure of a system incorporating an input device with a resistance film type touch panel.

An input device 1 is placed on a screen 3 of a display device 2. Icons, buttons and so on are projected on the screen 3 of the display device 2. Depressing positions corresponding to the icons and the buttons projected on the screen 3 of the input device 1 starts applications corresponding to the icons and the buttons.

The input device 1 comprises a touch panel 11 and an interface circuit substrate 12.

FIG. 2 is an exploded perspective view of the touch panel 11.

The resistance film type touch panel 11 is constructed in a stack together with a lower substrate 21 and an upper substrate 22 by putting dot spacers, which are not illustrated, between the lower substrate 21 and the upper substrate 22. A flexible wiring board 4 to be connected with the interface circuit substrate 12 is glued to an edge between the lower substrate 21 and the upper substrate 22.

The lower substrate 21 comprises a glass substrate 31, a conductive film 32, electrodes 33 and 34, and wiring patterns 35 through 38. The conductive film 32 is formed of a transparent conductive material such as ITO (indium tin oxide), and is set on the glass board 31.

The electrode 33 is formed of a conductive material such as aluminum, and is shaped in the form of a straight line on an edge of the conductive film 32 in the arrow X1 direction. The electrode 34 is formed of a conductive material such as aluminum, and is shaped in the form of a straight line on an edge of the conductive film 32 in the arrow X2 direction. The electrodes 33 and 34 are formed in parallel.

The wiring pattern 35 is connected with the electrode 33 at its one end, and with a wiring pattern 51 on a flexible wiring board 23 at the other end. The wiring pattern 36 is connected with the electrode 34 at its one end, and with a wiring pattern 52 on the flexible wiring board 23 at the other end. As mentioned above, both the electrodes 33 and 34 are connected with the interface circuit substrate 12. Also, the wiring pattern 37 is connected with a wiring pattern 53 on the flexible wiring board 23, and the wiring pattern 38 is connected with a wiring pattern 54 on the flexible wiring board 23.

The upper substrate 22 comprises a film 41, a conductive film 42, electrodes 43 and 44, and wiring patterns 45 and 46. The film 41 is formed of synthetic resin such as PET (poly-ethylene-telephtalete) shaped in the form of a film, and has flexibility. The conductive film 42 is formed of a transparent conductive material such as TTO (indium tin oxide), and is set on the under surface of the film 41 toward the lower substrate 21.

The electrode 43 is formed of a conductive material such as aluminum, and is shaped in the form of a straight line on an edge of the conductive film 42 in the arrow Y1 direction. The electrode 44 is formed of a conductive material such as aluminum, and is shaped in the form of a straight line on an edge of the conductive film 42 in the arrow Y2 direction. The electrodes 43 and 44 are formed in parallel.

The wiring pattern 45 is connected with the electrode 43 at its one ends and with the wiring pattern 53 on the flexible wiring board 23 at the other end through the wiring pattern 37 on the lower substrate 21. The wiring pattern 46 is connected with the electrode 44 at its one end, and with the wiring pattern 54 on the flexible wiring board 23 at the other end through the wiring pattern 38 on the lower substrate 21. The electrodes 43 and 44 are connected with the interface circuit substrate 12 through the flexible wiring board 23.

Dot spacers are formed of an insulator such as resin, and are placed between the lower substrate 21 and the upper substrate 22. While there is no depressing action, the dot spacers prevent contact between the conductive film 32 on the lower substrate 21 and the conductive film 42 on the upper substrate 22.

When the upper substrate 22 is depressed, the upper substrate 22 bends and the conductive film 42 on the upper substrate 22 touches the conductive film 32 on the lower substrate 21. The contact of the conductive film 42 on the upper substrate 22 and the conductive film 32 on the lower substrate 21 provides coordinates of the contact point that can be detected.

An explanation of a series of actions for detecting the coordinate will now be given.

The interface circuit substrate 12 repeatedly alternates between the following two actions. One action is to apply a predetermined voltage of Vcc between the electrodes 33 and 34 formed on the lower substrate 21 and to detect an electric potential of the electrode 43 of the upper substrate 22. The other action is to apply a predetermined voltage of Vcc between the electrodes 43 and 44 formed on the upper substrate 22 and to detect an electric potential of the electrode 33 on the lower substrate 21.

If the predetermined voltage of Vcc between the electrodes 33 and 34 formed on the lower substrate 21 is applied, a potential gradient between the electrodes 33 and 34 is caused. Then, detecting an electric potential of the contact point through the electrode 43 of the upper substrate 22 makes it possible to detect a position of the contact point in the X-axis directions.

On the other hand, if the predetermined voltage of Vcc between the electrodes 43 and 44 formed on the upper substrate 22 is applied, a potential gradient between the electrodes 43 and 44 is caused. Then, detecting an electric potential of the contact point through the electrode 33 or the electrode 34 of the lower substrate 21 makes it possible to detect a position of the contact point in the Y-axis directions.

At this time, the potential gradient between the electrodes 43 and 44 of the upper substrate 22 is different from the potential gradient between the electrodes 33 and 34 on the lower substrate 21. Accordingly, it is possible to perform detection without the resistance of the conductive films 32 or 42 influencing where the electric potential of the contact point is detected. The interface circuit substrate 12 detects a coordinate in the X-axis directions from the electric potential in the X-axis directions, a coordinate in the Y-axis directions from the electric potential in the Y-axis directions, and sends these coordinates to an information process unit 5.

As illustrated in FIG. 1, the touch panel 11 is glued and mounted on the display device 2. According to what is shown on the screen 3 of the display device 2, an operator gives inputs. Thus, it is important to accurately position the touch panel 11 relative to the screen 3 of the display device 2.

The touch panel 11 and the display device 2 have been conventionally positioned by fitting outer shapes of the touch panel 11 and the display device 2. As a result, the relative position of the touch panel 11 to the display device 2 is inaccurate, whereby resulting in poor operation. Thus, it is required that the relative position of the touch panel 11 to the display device 2 be corrected.

Conventionally, the relative position of the touch panel 11 to the display device 2 has been commonly corrected by operator's manipulations. The operator manipulates the input device 1 and others to set the information processing unit 5 in a position correction mode. Once the information processing unit 5 is in the position correction mode, the information processing unit 5 starts to display a position to be depressed on the screen 3 of the display device 2. The operator depresses the position displayed on the display device 2.

Next, the information processing unit 5 detects a position on the touch panel 11 depressed by the operator on the basis of coordinate information from the interface circuit 12.

Then, the information processing unit 5 compares the position to be depressed on the screen 3 of the display device 2 with the position on the touch panel 11 depressed by the operator, and computes a correction value so that the coordinate information from the interface circuit 12 can be consistent with the coordinate information on the position to be depressed on the screen 3 of the display device 2. The information processing unit 5 or the interface circuit 12 saves the correction value. Thereafter, the information processing unit 5 or the interface circuit 12 corrects the coordinate information on the basis of the saved correction value. The information processing unit 5 determines a coordinate on the basis of the coordinate information that has just been corrected according to the correction value.

Under the heretofore-described conventional correction of the relative position of the touch panel 11 to the display device 2, however, operations for correcting the relative position are complicated because of the necessity of operator's manipulations.

On the other hand, the connections between wiring patterns on the touch panel 11 or the touch panel itself and the flexible wiring board 23 deteriorate over time, whereby enlarging the wiring resistance. Under conventional touch panels, however, wiring conditions of the touch panel 11, the flexible wiring board 23 and others have not been taken into consideration. Thus, we have the problem that the precision of the coordinate detection deteriorates over time.

SUMMARY OF THE INVENTION

It is a general object of the present invention to provide an improved and useful input device and electronic device in which the above-mentioned problems are eliminated.

A more specific object of the present invention is to provide an input device and an electronic device capable of performing corrections easily.

In order to achieve the above-mentioned object, there is provided according to one aspect of the present invention an input device generating a signal corresponding to a position depressed on an input domain, comprising: a correction domain that is set in a position different from the input domain, the correction domain generating the signal corresponding to the depressed position.

According to the present invention, if the correction domain is set in a position different from the input domain, depression on the correction domain makes it possible to detect a position of the input device. Thus, if a case is mounted so that the correction domain can be depressed through the case, a position of the input device toward the case can be detected automatically without operator's depression on the input domain.

Additionally, in the input device according to the present invention, the correction domains may be set in a plurality of positions around the input domain.

Additionally, in the input device according to the present invention, the correction domains may comprise a first correction domain generating a signal corresponding to a coordinate in the X-axis directions and a second correction domain generating a signal corresponding to a coordinate in the Y-axis directions.

According to the present invention, if the correction domains are set in a plurality of positions such as the first correction domain and the second correction domain wherein the first correction domain generates the signal corresponding to the coordinate in the X-axis directions and the second correction domain generates the signal corresponding to the coordinate in the Y-axis directions, it is possible to detect misalignment with respect to a plurality of axis directions and perform an accurate correction.

Additionally, in the input device according to the present invention, the input device may comprise a correction unit receiving a signal from the input domain and a signal from the correction domain, the correction unit correcting a signal corresponding to a position depressed on the input domain on the basis of a signal corresponding to a position depressed on the correction domain.

According to the present invention, it is possible to perform accurate coordinate detection, because the signal corresponding to the position depressed on the input domain can be corrected on the basis of the signal corresponding to the position depressed on the correction domain.

In order to achieve the above-mentioned objects, there is provided according to another aspect of the present invention an input device, comprising: a protrusion part that is set in the opposite position to the correction domain, the protrusion depressing the correction domain.

According to the present invention, it is possible to position an input domain toward a position of the protrusion automatically, because the mounted protrusion depresses the correction domain.

In order to achieve the above-mentioned objects, there is provided according to another aspect of the present invention an input device, comprising: a touch panel generating an amount of voltage corresponding to a depressed position; and a cable connecting the touch panel and an external circuit, the touch panel containing a first connection pad connected with an input and output terminal of the cable and a second connection pad connected with the first connection pad so as to have a connection with an internal circuit of the touch panel; and the cable containing first wiring connected with the first connection pad so as to input and output a signal to the internal circuit of the touch panel, and second wiring connected with the second connection pad so as to detect an electric potential of the second connection pad.

According to the present invention, if an amount of voltage is applied to the first connection pad through the first wiring and the electric potential of the second connection pad is detected through the second wiring, a condition of the touch panel can be detected on the basis of resistance of wirings on the touch panel and others.

Additionally, in the input device according to the present invention, an electric potential of the second connection pad may be detected through the second wiring. Based on the detection result, a coordinate detection result is corrected with the touch panel.

According to the present invention, a condition of the touch panel is detected, whereby the correction of the coordinate detection result makes it possible to perform more accurate coordinate detection.

Additionally, in the input device according to the present invention, an electric potential of the second connection pad may be detected through the second wiring, thereby determining a wiring condition of the touch panel and the cable.

According to the present invention, the electric potential of the second connection pad is detected through the second wiring and, thereby determining the wiring condition of the touch panel and the cable. If the wiring condition is in disorder, an alarm is delivered to their superior units, whereby the use in disorder can be prevented.

Other objects, features and advantages of the present invention will become more apparent from the following detailed description when read in conjunction with the accompanying drawings.

DETAILED DESCRIPTION OF THE PREFERRED EMBODIMENTS

Figure 1:
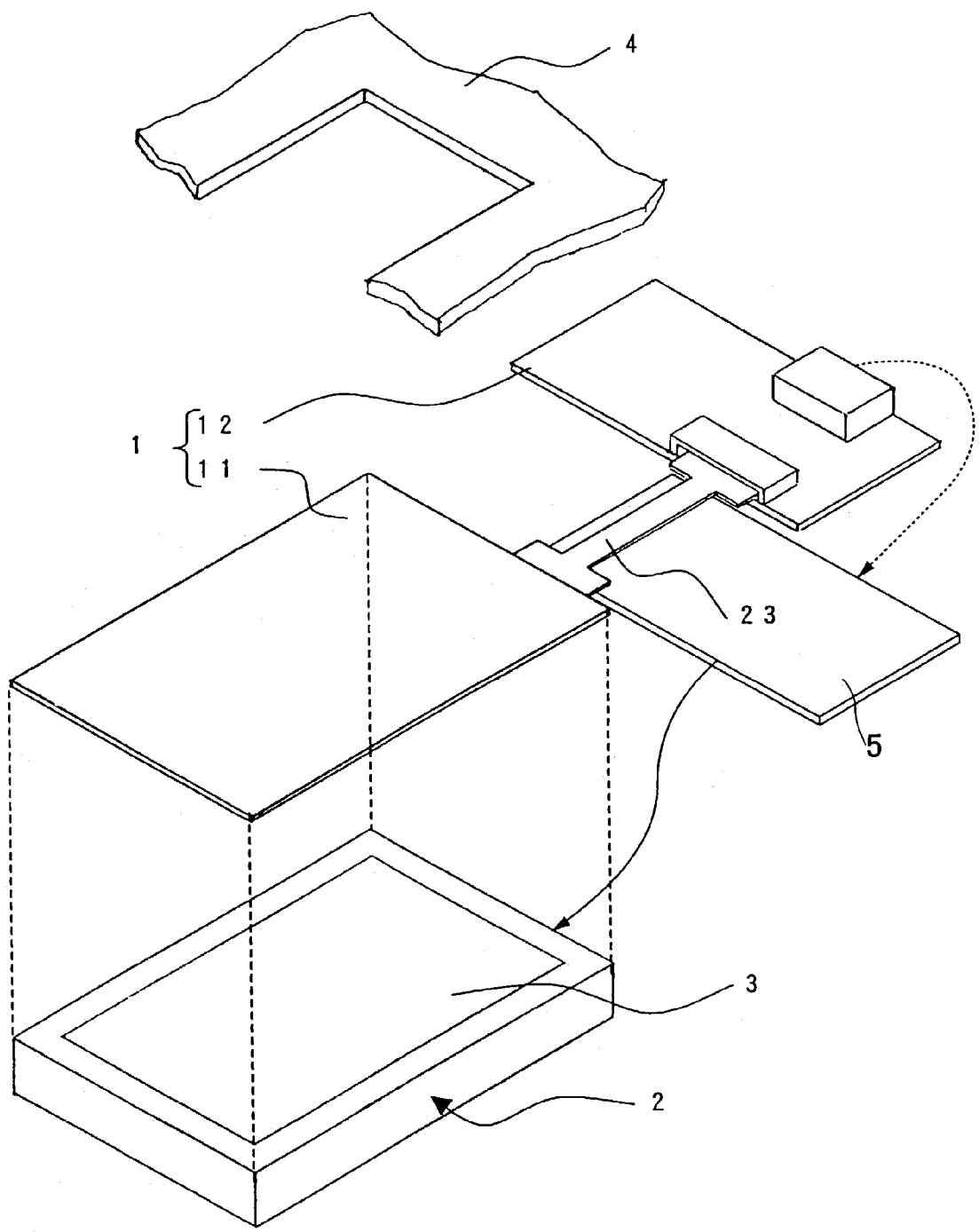
FIG. 1 is a diagram illustrating a structure incorporating an input device system with a resistance film type touch panel.

A description will now be given, with reference to FIG. 3, of the first embodiment of the present invention. FIG. 3 is a diagram illustrating a structure of an input device according to the first embodiment of the present invention. In FIG. 3, parts that are the same as the parts shown in FIG. 1 and FIG. 2 are given the same reference numerals, and descriptions thereof will be omitted.

Figure 2:
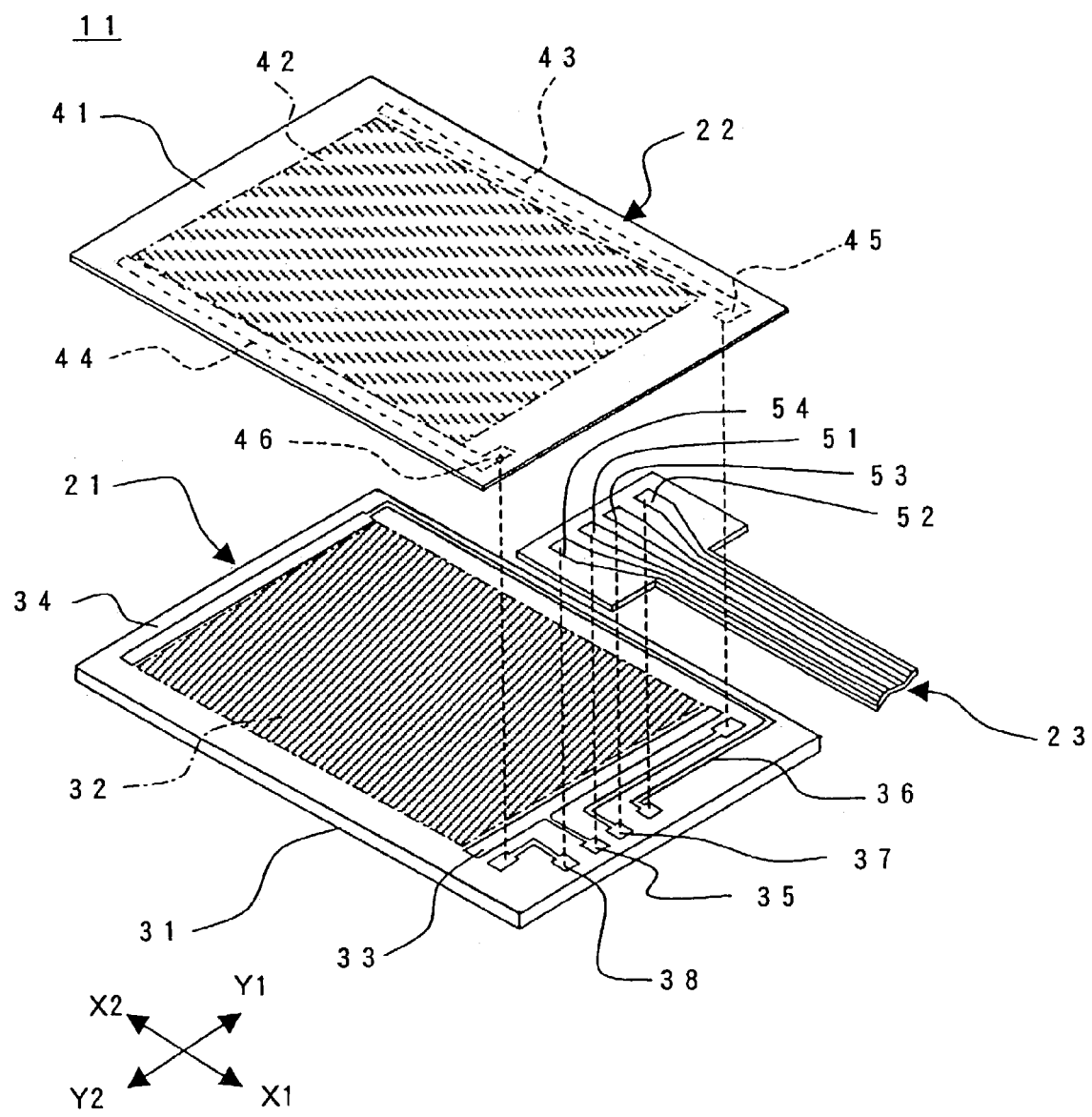
FIG. 2 is an exploded perspective view of the touch panel of FIG. 1.
Figure 3:
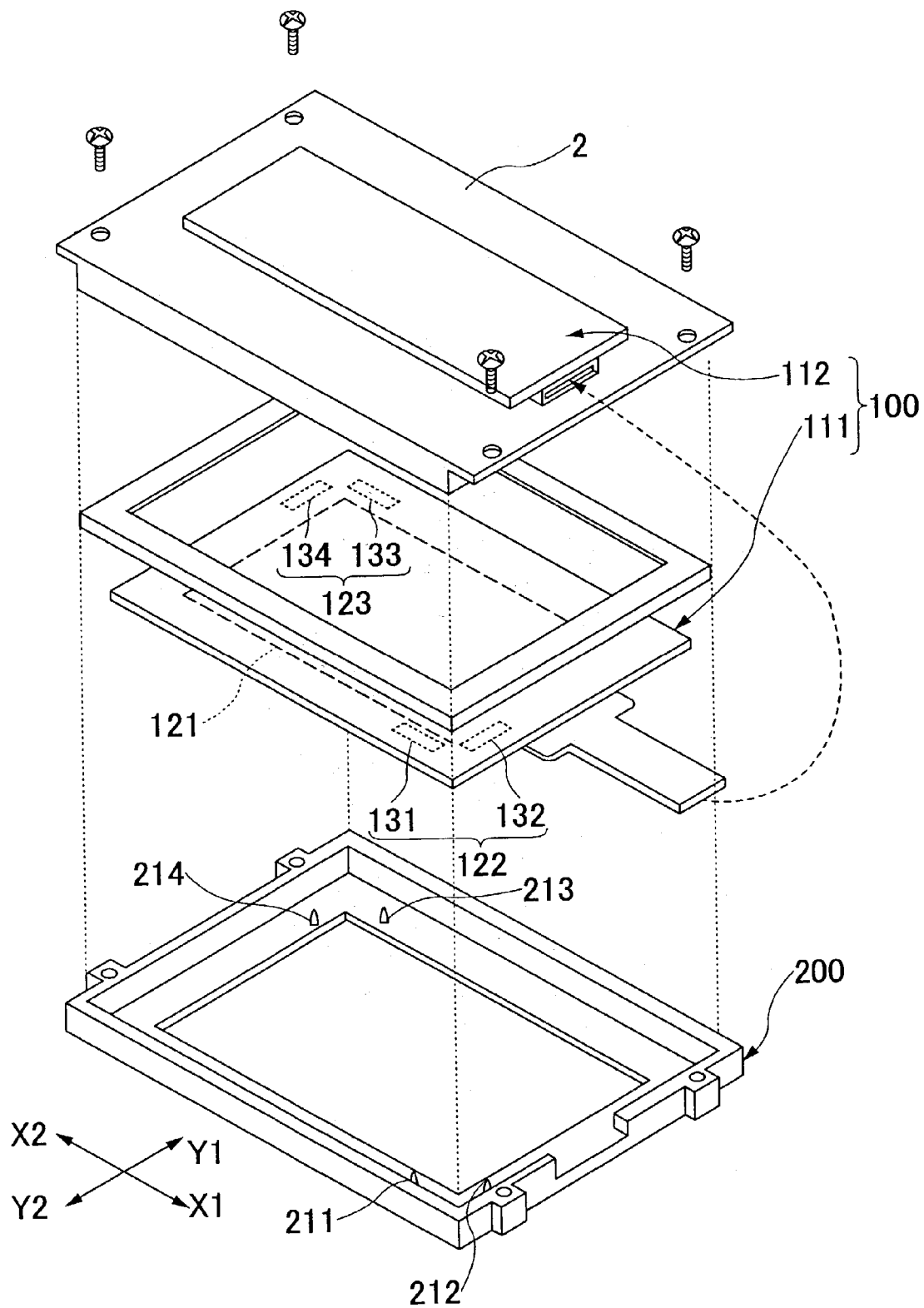
FIG. 3 is a diagram illustrating a structure of an input device according to a first embodiment of the present invention.

An input device 100 according to the first embodiment of the present invention differs from the input device 1 shown in FIG. 1 and FIG. 2 with respect to the structure of a touch panel 111 and a process action of an interface circuit 112. Furthermore, the structure of a front case 200, where the input device 100 is mounted, is different.

Figure 4:
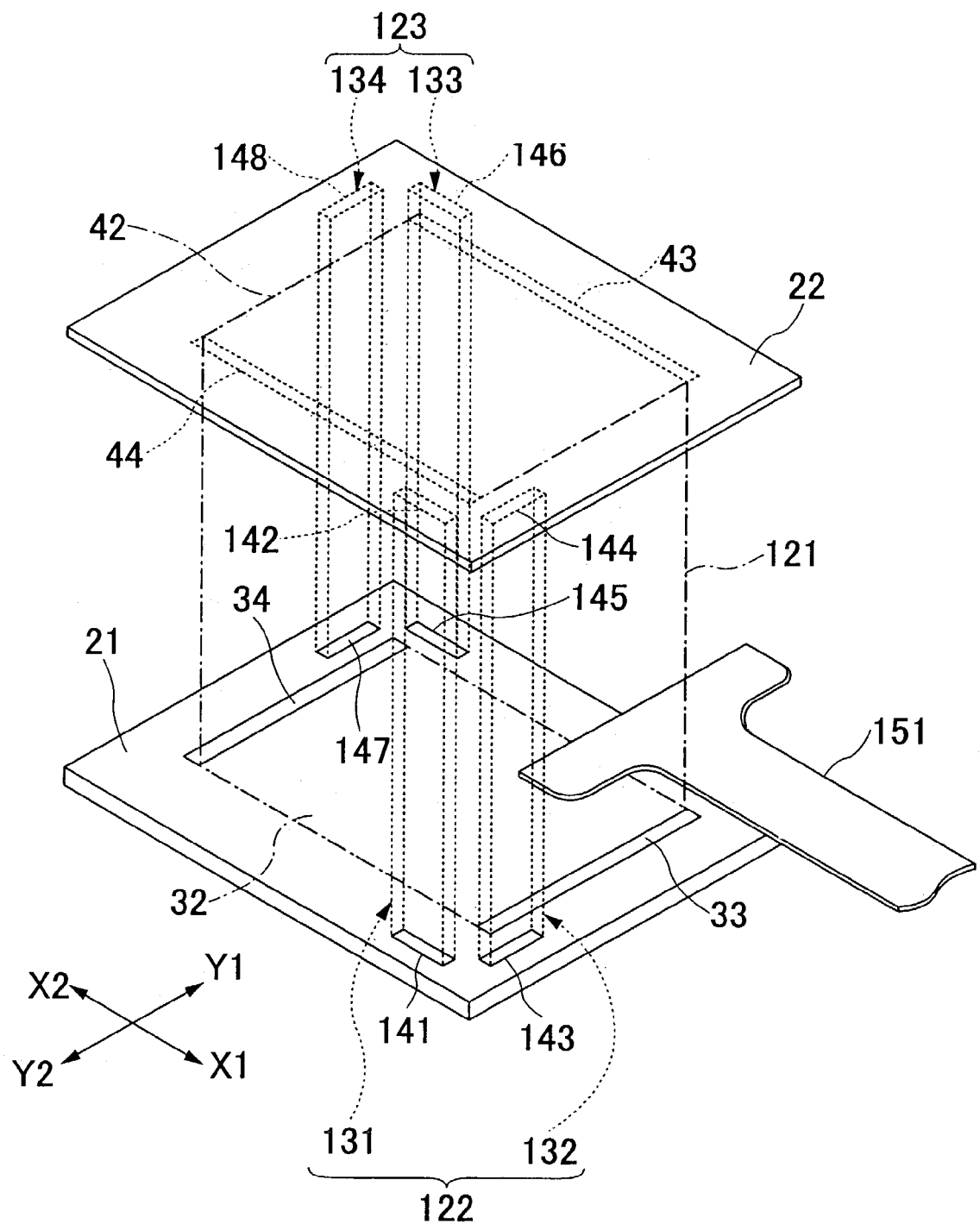
FIG. 4 is an exploded perspective view of the touch panel of FIG. 3.

FIG. 4 is an exploded perspective view of the touch panel 111.

The touch panel 111 according to the first embodiment of the present invention comprises an input domain 121, a first correction domain 122 and a second correction domain 123 around and apart from the input domain 121. The first correction domain 122 comprises a first position detection unit in the X-axis directions 131 and a first position detection unit in the Y-axis directions 132. The second correction domain 123 comprises a second position detection unit in the X-axis directions 133 and a second position detection unit in the Y-axis directions 134.

The first position detection unit in the X-axis directions 131 is mounted separately from the input domain 121 at the outside of the lower-right edge of the input domain 121 on the touch panel 111, and is lengthened in the X-axis directions. The first position detection unit in the X-axis directions 131 comprises a lower electrode 141 formed on the lower substrate 21 and an upper electrode 142 formed on the upper substrate 22. The lower electrode 141 is formed of a conductive material with comparatively high resistance such as ITO, and the upper electrode 142 is formed of a conductive material with low resistance such as aluminum. Both ends of the upper electrode 142 and one end of the lower electrode 141 are connected with the interface circuit substrate 112 through a flexible wiring board 151.

The first position detection unit in the Y-axis directions 132 is mounted separately from the input domain 121 at the outside of the lower-right edge of the input domain 121 on the touch panel 111, and is lengthened in the Y-axis directions. The first position detection unit in the Y-axis directions 132 comprises a lower electrode 143 formed on the lower substrate 21 and an upper electrode 144 formed on the upper substrate 22. Both ends of the upper electrode 144 and one end of the lower electrode 143 are connected with the interface circuit substrate 112 through the flexible wiring board 151.

The second position detection unit in the X-axis directions 133 is mounted separately from the input domain 121 at the outside of the upper-left edge of the input domain 121 on the touch panel 111, and is lengthened in the X-axis directions. The second position detection unit in the X-axis directions 133 comprises a lower electrode 145 formed on the lower substrate 21 and an upper electrode 146 formed on the upper substrate 22. Both ends of the upper electrode 146 and one end of the lower electrode 145 are connected with the interface circuit substrate 112 through the flexible wiring board 151.

The second position detection unit in the Y-axis direction 134 is mounted separately from the input domain 121 at the outside of the upper-left edge of the input domain 121 on the touch panel 111, and is lengthened in the Y-axis directions. The second position detection unit in the Y-axis directions 134 comprises a lower electrode 147 formed on the lower substrate 21 and an upper electrode 148 formed on the upper substrate 22. Both ends of the upper electrode 148 and one end of the lower electrode 147 are connected with the interface circuit substrate 112 through the flexible wiring board 151.

Figure 5:
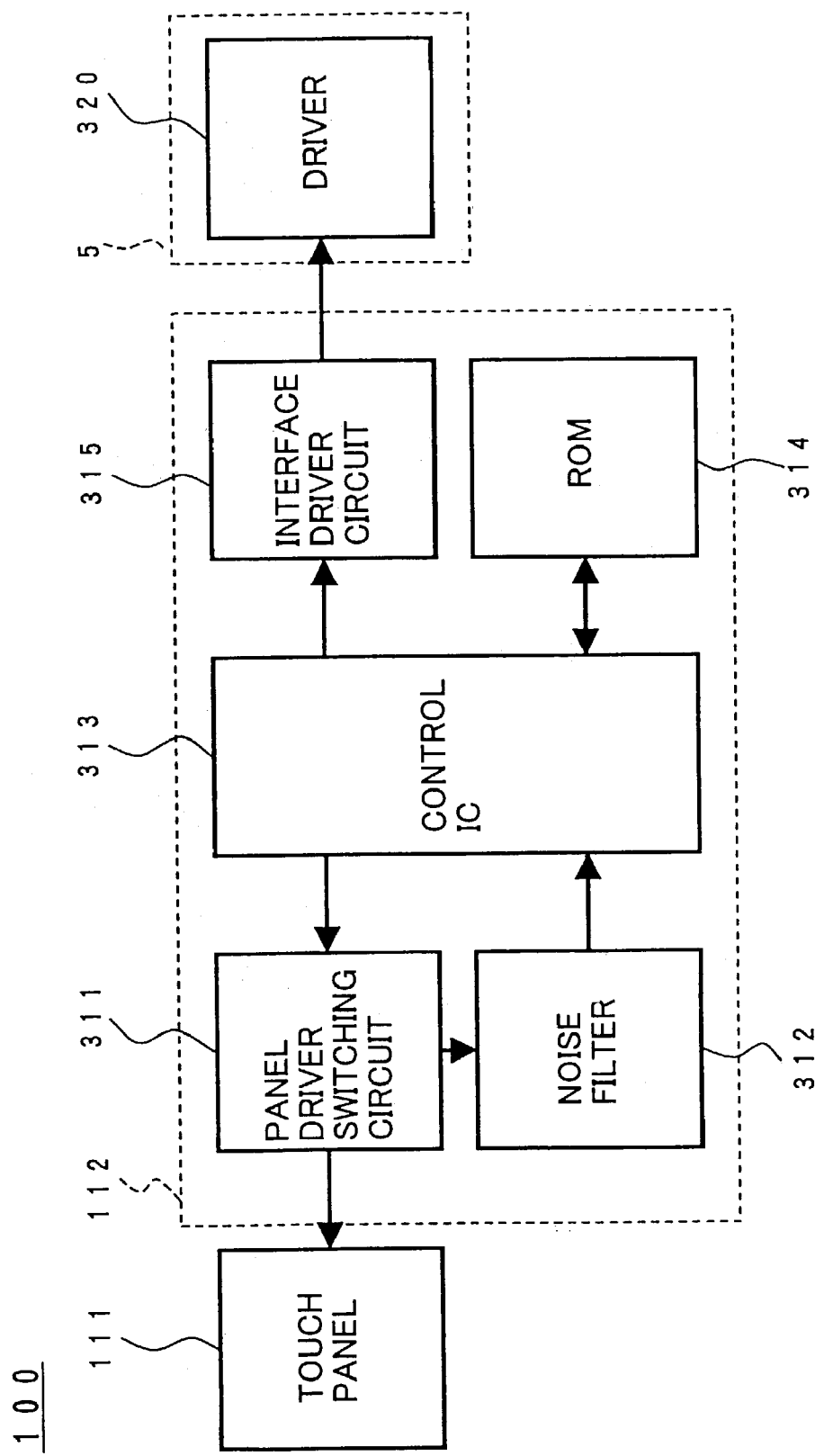
FIG. 5 is a block diagram illustrating a structure of an interface circuit substrate of FIG. 3.

FIG. 5 is a block diagram illustrating the structure of the interface circuit substrate 112.

The interface circuit substrate 112 comprises a panel driver switching circuit 311, a noise filter 312, a control IC 313, a ROM 314 and an interface driver circuit 315.

The panel driver switching circuit 311 has applied a source voltage of Vcc and receives a switching control signal from the control IC 313. The panel driver switching circuit 311 controls an action of the touch panel on the basis of the switching control signal from the control IC 313.

Figure 6:
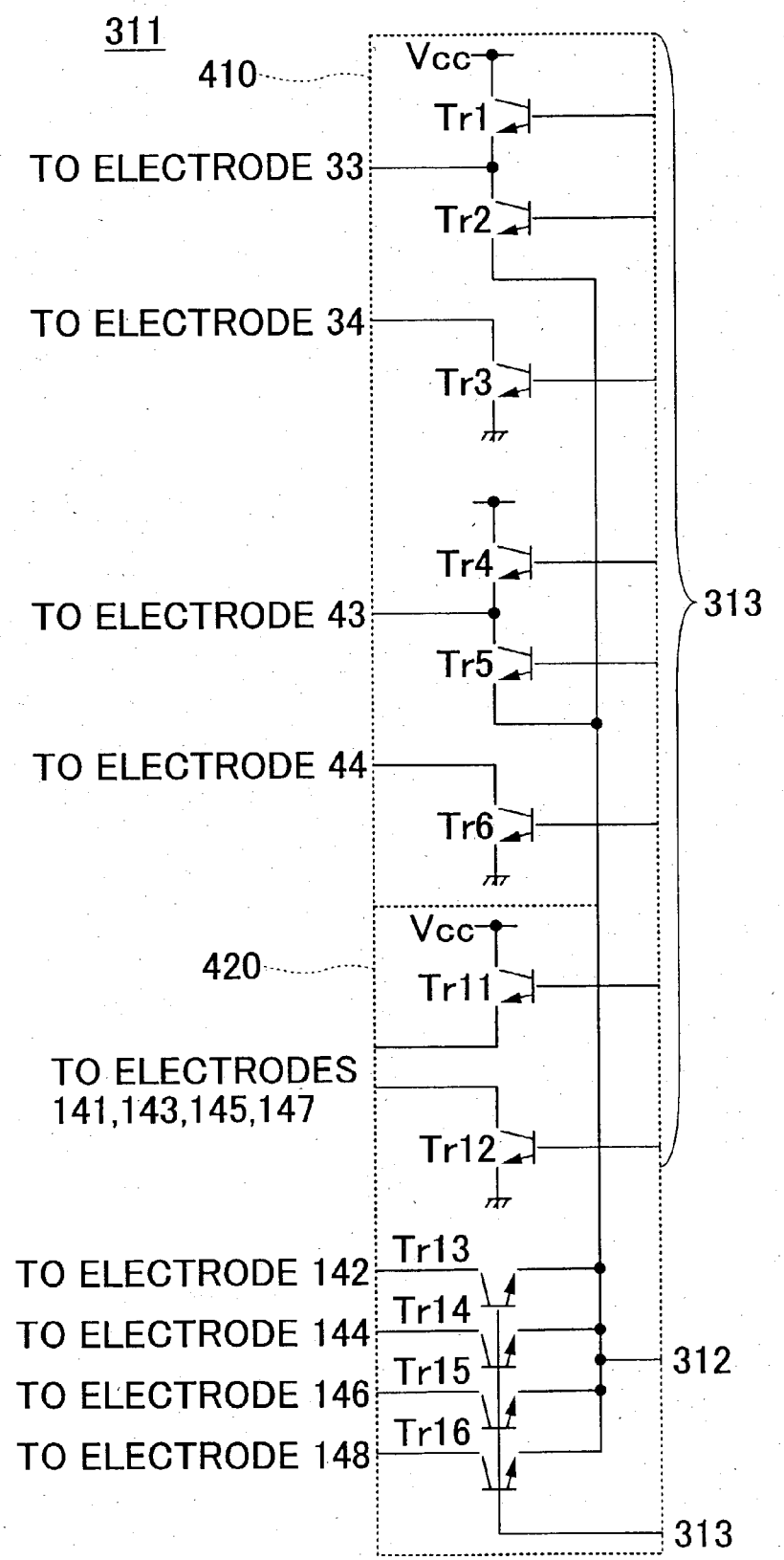
FIG. 6 is a diagram illustrating a circuit structure of a panel driver switching circuit.

FIG. 6 is a diagram illustrating the circuit structure of the panel driver switching circuit 311.

The panel driver switching circuit 311 comprises a coordinate detection circuit 410 and a coordinate detection circuit for correction 420. The coordinate detection circuit 410 comprises transistors Tr1 through Tr6 and Tr11 through Tr14.

When a coordinate in the X-axis directions is detected, the transistors Tr1, Tr3 and Tr5 turn on and the transistors Tr2, Tr4, Tr6 and Tr11 through Tr16 turn off. If the transistors Tr1 and Tr3 turn on, a predetermined voltage is applied between the electrodes 33 and 34, thereby causing a potential gradient in the X-axis directions in the conductive film 32 on the lower substrate 21. Here, when the upper substrate 22 is depressed, the electrode 43 generates a signal corresponding to the depressed position. At this time, the noise filter 312 receives the signal generated by the electrode 43, because the transistor Tr5 is on.

On the other hand, when a coordinate in the Y-axis directions is detected, the transistors Tr2, Tr4 and Tr6 turn on and the transistors Tr1, Tr3, Tr5 and Tr11 through Tr16 turn off. If the transistors Tr4 and Tr6 turn on, a predetermined voltage is applied between the electrodes 43 and 44, thereby causing a potential gradient in the Y-axis directions in the conductive film 32 on the lower substrate 21. Here, when the upper substrate 22 is depressed, the electrode 33 generates a signal corresponding to the depressed position. At this time, the noise filter 312 receives the signal generated by the electrode 33, because the transistor Tr2 is on.

Furthermore, the coordinate detection circuit for correction 420 is driven at the time when a correction value is required, for example, at the starting time. The coordinate detection circuit for correction 420 comprises the transistors Tr11 through Tr16.

When the correction value is gained, the transistors Tr11 and Tr12 turn on, thereby applying a predetermined voltage of Vcc to both ends of the electrodes 141, 143, 145 and 147. At the result, a potential gradient is caused in each of the electrodes 141, 143, 145 and 147

At this time, protrusions formed in the front case 200 depress predetermined positions of the electrodes 142, 144, 146 and 148, whereby the electrode 142 contacts with the electrode 141, the electrode 144 contacts with the electrode 143, the electrode 146 contacts with the electrode 145 and the electrode 148 contacts with the electrode 147.

If the transistor Tr13 turns on and the transistors Tr14 through Tr16 turn off, a first coordinate in the X-axis directions is detected. If the transistor Tr14 turns on and the transistors Tr13, Tr15 and Tr16 turn off, a first coordinate in the Y-axis directions is detected. If the transistor Tr15 turns on and the transistors Tr13, Tr14 and Tr16 turn off, a second coordinate in the X-axis directions is detected. If the transistor Tr16 turns on and the transistors Tr13 through Tr15 turn off, a second coordinate in the Y-axis directions is detected.

Figure 7:
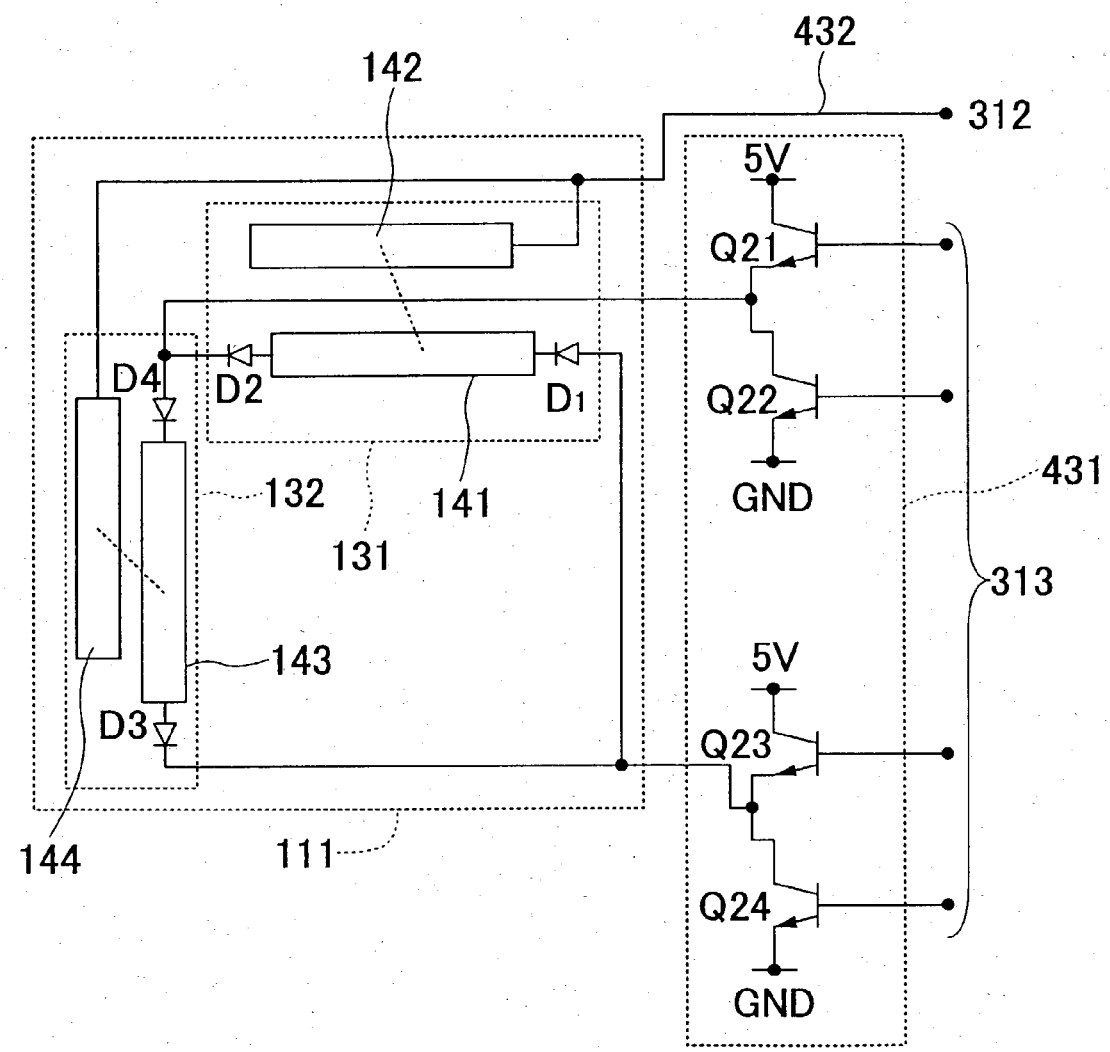
FIG. 7 is a diagram illustrating a circuit structure of parts according to a variation of the first embodiment of the present invention.

FIG. 7 is a diagram illustrating a circuit structure of parts according to a variation of the first embodiment of the present invention. In FIG. 7, parts that are the same as the parts shown in FIG. 3 and FIG. 4 are given the same reference numerals, and descriptions thereof will be omitted.

In the variation, the first position detection unit in the X-axis directions 131 and the first position detection unit in the Y-axis directions 132 share a terminal.

In the variation, diodes D1 and D2 have mutually homopolar connections with both ends of the electrode 141, and diodes D3 and D4 have mutually homopolar connections with both ends of the electrode 143. A driver switching circuit for correction 431, which is a portion of the panel driver switching circuit 311, controls power supply to the electrodes 141 and 143, and detects an electric potential of common wiring 432 connecting the electrodes 142 and 144.

The driver switching circuit for correction 431 comprises transistors Tr21, Tr22, Tr23 and Tr24. If the transistors Tr22 and Tr23 turn on and the transistors Tr21 and Tr24 turn off, the diodes D1 and D2 turn on, thereby causing an electric gradient between both ends of the electrode 141. At a result, the electrode 142 has an electric potential according to a protrusion 211 in the front case 200. At this time, an electric potential of the electrode 144 is not generated, because the diodes D3 and D4 turn off. Thus, an electric potential of the common wiring 432 turns into the electric potential of the electrode 142. The detection of the electric potential of the common wiring 432 makes it possible to detect a first position in the X-axis directions.

On the other hand, if the transistors Tr21 and Tr24 turn on and the transistors Tr22 and Tr23 turn off, the diodes D3 and D4 turn on, thereby causing an electric gradient between both ends of the electrode 143. At a result, the electrode 144 has an electric potential according to a protrusion 212 in the front case 200. At this time, an electric potential of the electrode 142 is not generated, because the diodes D1 and D2 turn off. Thus, an electric potential of the common wiring 432 turns into the electric potential of the electrode 143. The detection of the electric potential of the common wiring 432 makes it possible to detect a first position in the Y-axis directions.

FIG. 7 mainly illustrates a structure of the variant of the first position detection unit in the X-axis direction 131 and the first position detection unit in the Y-axis direction 132. However, if the second position detection unit in the X-axis directions 133 and the second position detection unit in the Y-axis direction 134 are constructed similarly to the above-mentioned structure, it is possible to detect the second position in the X-axis directions and the second position in the Y-axis directions.

The noise filter 312 is connected with the panel driver switching circuit 311 and receives a signal from an electrode selected by the panel driver switching circuit 311. The noise filter 312 removes noise out of the signal generated by the electrode selected by the panel driver switching circuit 311. Thereafter, the control IC 313 receives the noise-free signal processed by the noise filter 312.

The control IC 313 provides the panel driver switching circuit 311 with a switching control signal and converts a signal from the noise filter 312 into digital data to execute a variety of processes. The control IC 313 executes the processes by using programs saved in the ROM 314.

Figure 8:
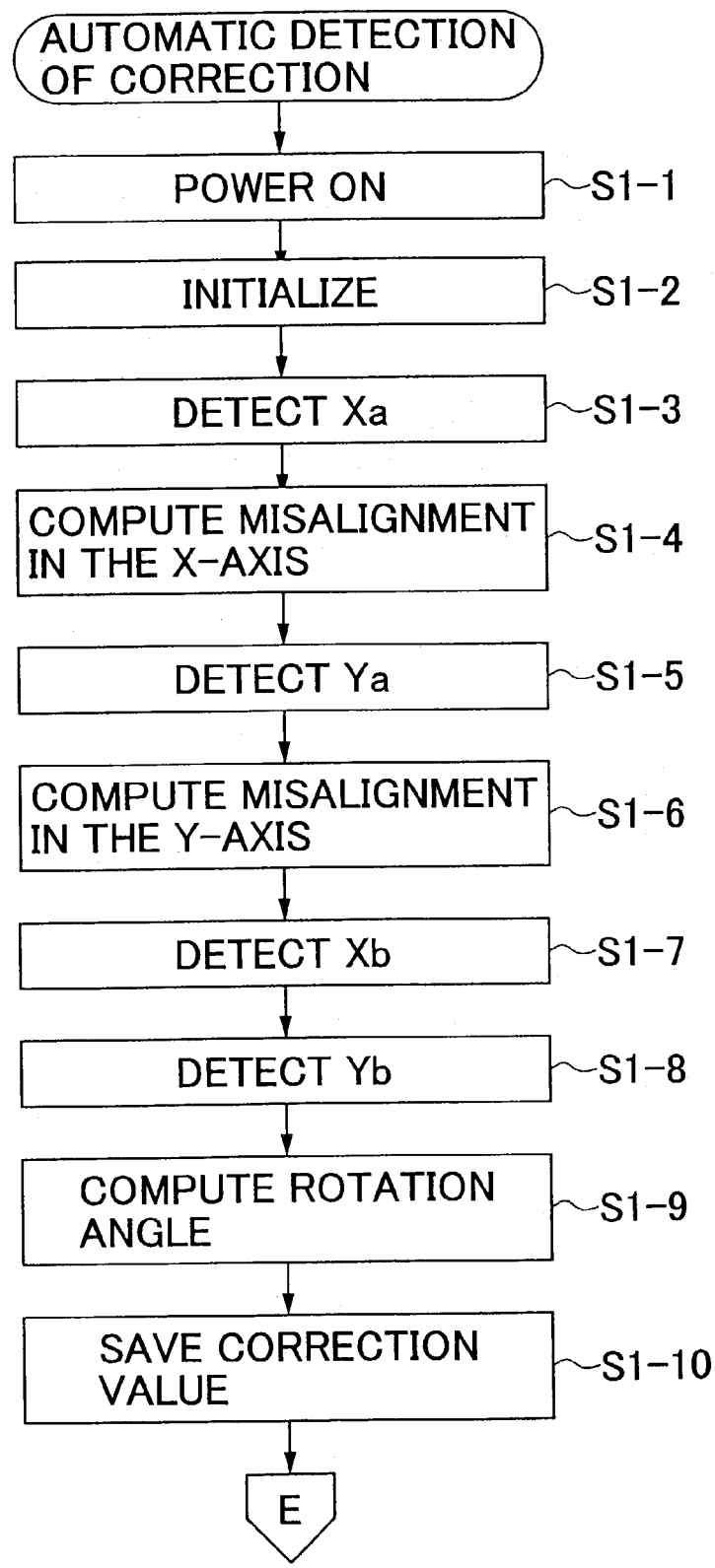
FIG. 8 is a flowchart of a correction process program executed by a control IC according to the present invention.

FIG. 8 is a flowchart of a correction process program executed by the control IC 313.

After making power supply at the step S1-1, the control IC 313 is initialized at the step S1-2.

At the step S1-3, the control IC 313 detects a first coordinate in the X-axis directions. If the transistors Tr1 through Tr6 and Tr14 through Tr16 in the panel driver switching circuit 311 turn off and the transistors Tr11 through Tr13 in the panel driver switching circuit 311 turn on, an electric potential of the electrode 142 is detected, whereby the first coordinate in the X-axis directions is detected.

At the step S1-4, the control IC 313 detects misalignment of the touch panel 111 in the X-axis directions on the basis of the first coordinate in the X-axis directions. An amount of the misalignment in the X-axis directions is computed as a difference between the first coordinate in the X-axis directions Xa that has been detected at the step S1-3 and the position coordinate XA of the protrusion 211 in the front case 200.

At the step S1-5, the control IC 313 detects a first coordinate in the Y-axis directions. If the transistors Tr1 through Tr6, Tr13, Tr15 and Tr16 in the panel driver switching circuit 311 turn off and the transistors Tr11, Tr12 and Tr14 in the panel driver switching circuit 311 turn on, an electric potential of the electrode 144 is detected, whereby the first coordinate in the Y-axis directions is detected.

At the step S1-6, the control IC 313 detects misalignment of the touch panel 111 in the Y-axis directions on the basis of the first coordinate in the Y-axis directions. An amount of the misalignment in the Y-axis directions is computed as a difference between the first coordinate in the Y-axis directions Ya that has been detected at the step S1-4 and the position coordinate YA of the protrusion 212 of the front case 200.

At the step S1-7, the control IC 313 detects a second coordinate in the X-axis directions Xb. If the transistors Tr1 through Tr6, Tr13, Tr14 and Tr16 in the panel driver switching circuit 311 turn off and the transistors Tr11, Tr12 and Tr15 in the panel driver switching circuit 311 turn on, an electric potential of the electrode 146 is detected, whereby the second coordinate in the X-axis directions Xb is detected.

At the step S1-8, the control IC 313 detects a second coordinate in the Y-axis directions Yb. If the transistors Tr1 through Tr6 and Tr13 through Tr15 in the panel driver switching circuit 311 turn off and the transistors Tr11, Tr12 and Tr16 in the panel driver switching circuit 311 turn on, an electric potential of the electrode 148 is detected, whereby the second coordinate in the Y-axis directions Yb is detected.

At the step S1-9, the control IC 313 computes a rotation angle $\theta$ of the touch panel 111 with the front case 200. The rotation angle of the touch panel 111 to the front case 200 is computed on the basis of an amount of misalignment of the first coordinate in the X-axis directions Xa, the second coordinate in the X-axis directions Xb, the first coordinate in the Y-axis directions Ya and the second coordinate in the Y-axis directions Yb with the protrusions 211 through 214 of the front case 200. For example, if a reference table of rotation angles according to amounts of misalignment is prepared, the rotation angle $\theta$ is gained by referring to the table.

At the step S1-10, the control IC 313 saves the amount of misalignment in the X-axis directions $\Delta X$ computed at the step S1-4, the amount $\Delta Y$ of misalignment in the Y-axis directions computed at the step S1-6 and the rotation angle $\theta$ computed at the step S1-9 in its internal register and others.

Based on the amount of misalignment in the X-axis directions $\Delta X$, the amount $\Delta Y$ of misalignment in the Y-axis directions and the rotation angle $\theta$ that have been saved at the step S1-10, the control IC 313 corrects coordinate information provided by the touch panel 111 at a normal coordinate detection. The corrected coordinate information is delivered to the interface driver circuit 315. The interface driver circuit 315 converts the coordinate information from the control IC 313 in a predetermined interface form, and delivers it to the information processing unit 5. The information processing unit 5 comprises a computer and others, wherein the driver software 320 is installed. On the basis of the coordinate information provided by the input device 100, the information processing unit 5 controls the position of a pointer and others, and an execution of an application by driver software 320.

In this embodiment of the present invention, the correction is executed through the interface circuit substrate 112. On the other hand, the above-mentioned correction may be executed through the driver software 320 installed in the information processing unit 5.

A description of a second embodiment of the present invention will now be given.

Figure 9:
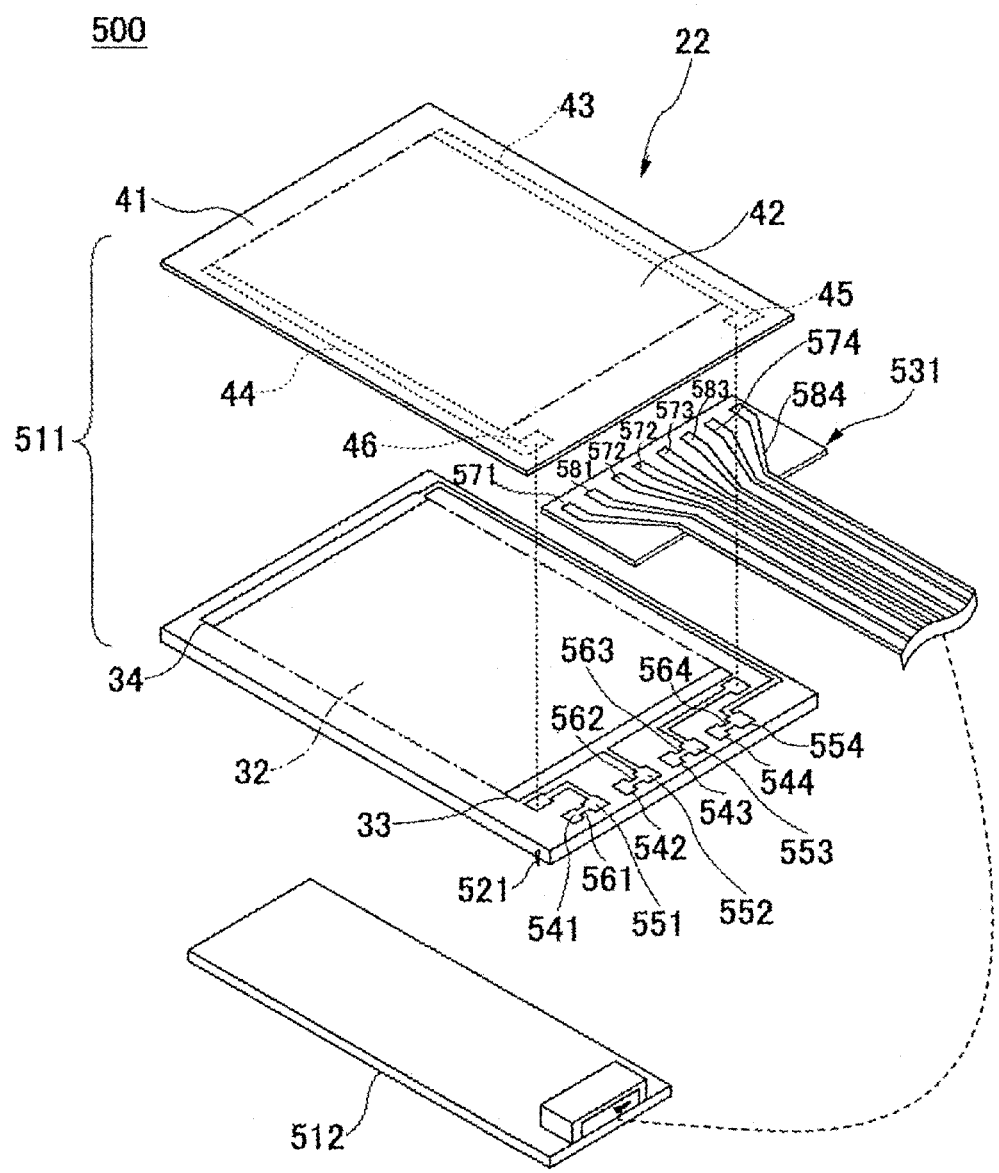
FIG. 9 is a diagram illustrating a structure of an input device according to a second embodiment of the present invention.

FIG. 9 is a diagram illustrating a structure of an input device according to a second embodiment of the present invention. In FIG. 9, parts that are the same as the parts shown in FIG. 4 are given the same reference numerals, and descriptions thereof will be omitted.

An input device 500 according to the second embodiment of the present invention detects deterioration of a conductive film over time and carries out a correction. The input device 500 comprises a touch panel 511 and an interface circuit substrate 512.

The touch panel 511 according to the second embodiment of the present invention contains cables to connect a lower substrate 521 with the touch panel 511 and the interface circuit substrate 512. Namely, the touch panel 511 has first connection pads 541, 542, 543 and 544 connected with an input and output terminal of a flexible wiring board 531, and second connection pads 551, 552, 553 and 554 connected with the first connection pad 541 so as to have a connection with an internal circuit of the touch panel 511. The first connection pad 541 is connected with the second connection pad 551 through a connection pattern 561 formed on the lower substrate 521. The first connection pad 542 is connected with the second connection pad 552 through a connection pattern 562 formed on the lower substrate 521. The first connection pad 543 is connected with the second connection pad 553 through a connection pattern 563 formed on the lower substrate 521. The first connection pad 544 is connected with the second connection pad 554 through a connection pattern 564 formed on the lower substrate 521.

The flexible wiring board 531 contains first wirings 571 through 574 and second wirings 581 through 584. The first wirings 571 through 574 are connected with the first connection pads 541 through 544 to input and output signals to the internal circuit of the touch panel 511. The second wirings 581 through 584 are connected with the second connection pads 551 through 554 so as to detect electric potentials of the second connection pads 551 through 554.

The first wiring 571 is connected with the first connection pad 541 formed on the lower substrate 521. The first wiring 572 is connected with the first connection pad 542 formed on the lower substrate 521. The first wiring 573 is connected with the first connection pad 543 formed on the lower substrate 521. The first wiring 574 is connected with the first connection pad 544 formed on the lower substrate 521.

The second wiring 581 is connected with the second connection pad 551 formed on the lower substrate 521. The second wiring 582 connected with the second connection pad 552 formed on the lower substrate 521. The second wiring 583 connected with the second connection pad 553 formed on the lower substrate 521. The second wiring 584 connected with the second connection pad 554 formed on the lower substrate 521.

Also, the interface substrate 512 differs from that of the first embodiment in processes executed by the control IC 313. The control IC 313 detects electric potentials of the second connection pads 551 through 554 by the second wirings 581 through 584, and determines wiring conditions of the touch panel 511 and the flexible wiring board 531. If the wiring conditions of the touch panel 511 and the flexible wiring board 531 are determined to be in disorder, the control IC 313 delivers an alarm to the information processing unit 5. Also, the control IC 313 corrects a coordinate detection result relating to the touch panel 511, which is delivered to the information processing unit 5.

Processes executed in the control IC 313 will now be explained.

Figure 10:
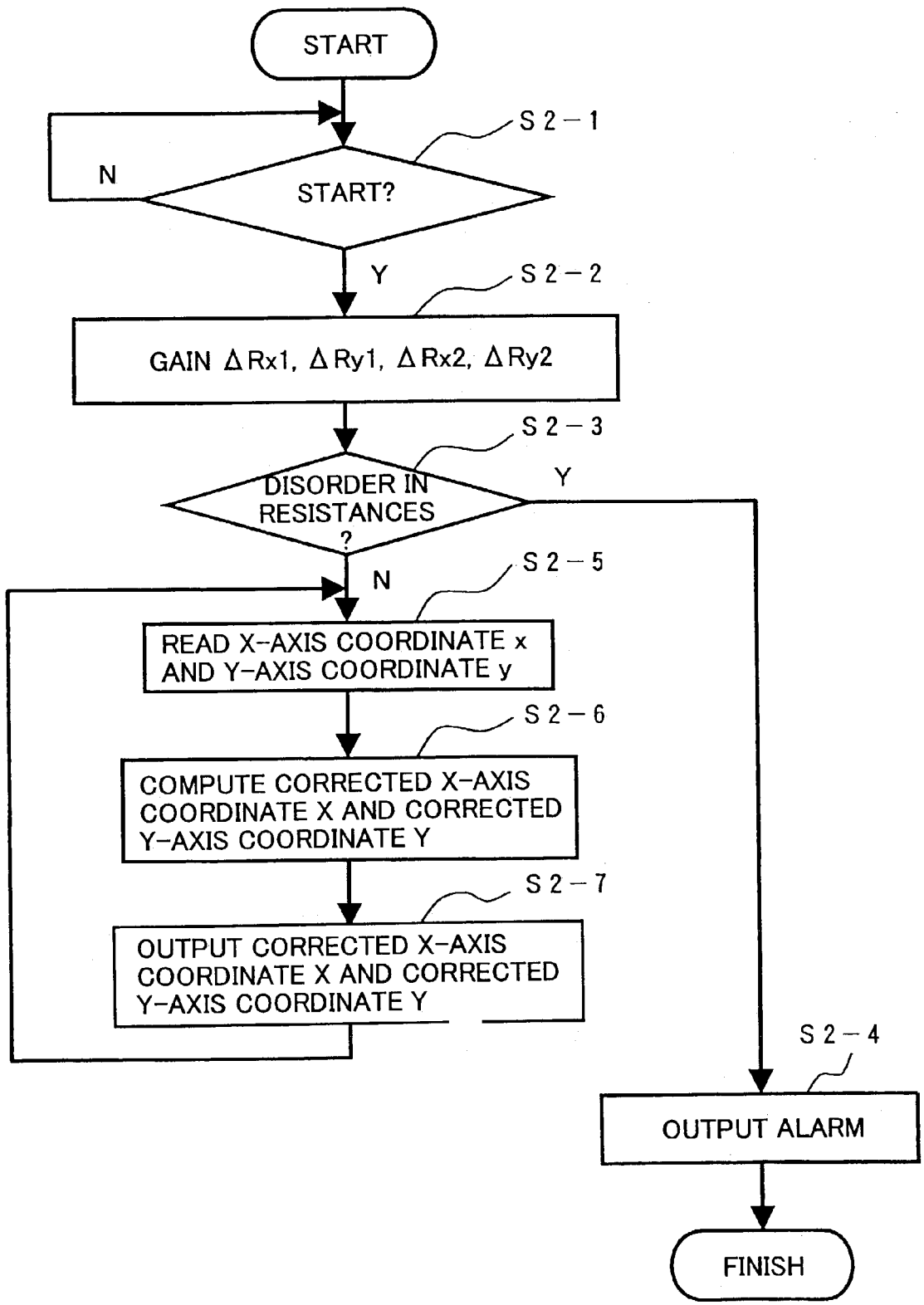
FIG. 10 is a flowchart of an input device according to the second embodiment of the present invention.

FIG. 10 is a flowchart of an input device according to the second embodiment of the present invention.

At the step S2-1, the input device is started. At the step S2-2, the control IC 313 applies a predetermined voltage to the first wirings 571 through 574, and detects electric potentials of the second wirings 581 through 584. Based on a voltage decreasing between the first wirings 571 through 574 and the second wirings 581 through 584, the control IC 313 detects resistances ΔR1 through ΔR4 between the first connection patterns 541 through 544 and the second connection patterns 551 through 554. At the step S2-3, the control IC 313 determines whether the resistances ΔR1 through ΔR4 gained at the step S2-2 are in disorder or not. For example, in the case that the resistances ΔR1 through ΔR4 do not fall in a predetermined range, the resistances ΔR1 through ΔR4 are determined to be in disorder.

If the resistances ΔR1 through ΔR4 are determined to be in disorder at the step S2-3, the control IC 313 delivers an alarm to the information processing unit 5 at the step S2-4. On the other hand, if the resistances ΔR1 through ΔR4 are determined not to be in disorder at the step S2-3, the control IC 313 saves values of the resistances ΔR1 through ΔR4 and performs normal coordinate detection. Under the normal coordinate detection, the control IC 313 reads a coordinate x in the X-axis directions and a y coordinate in the Y-axis directions from the touch panel 111 at the step S2-5.

From the coordinate x in the X-axis directions read at the step S2-6, the control IC 313 gains a corrected coordinate X in the X-axis directions and a corrected coordinate Y in the Y-axis directions, where the corrected coordinate X in the X-axis directions is involved in coordinate information resulting from correcting the coordinate x in the X-axis directions on the basis of the resistances ΔR1 through ΔR4.

At the step S2-7, the control IC 313 delivers the coordinate x in the X-axis directions and the y coordinate in the Y-axis directions to the information processing unit 5.

According to the second embodiment of the present invention, it is possible to detect conditions of patterns on the touch panel 511 and perform accurate coordinate detection, because the detected coordinates are corrected on the basis of the pattern conditions. Especially, even if the touch panel 511 deteriorates over time, it is always possible to perform accurate coordinate detection through the correction of the touch panel 511.

Furthermore, when it becomes impossible to correct the touch panel 511, the alarm is delivered and indicates that the touch panel 511 has reached its limit. Accordingly, the touch panel 511 can be exchanged before malfunction, and it is always possible to carry out an input operation in a satisfactory condition.

The present invention is not limited to the specifically disclosed embodiments, and variations and modifications may be made without departing from the scope of the present invention.

The present application is based on Japanese priority application No. 2002-081588 filed Mar. 22, 2002, the entire contents of which are hereby incorporated by reference.

What is claimed is:

1. An input device to generate a signal corresponding to a position depressed on an input domain of the input device, wherein the input device is mounted to a casing having a plurality of protrusions, comprising:

a detection unit to detect a position of the input device relative to the casing, the detection unit including a plurality of sense areas to sense contact with the plurality of protrusions, the plurality of sense areas provided around the input domain corresponding to the positions of the plurality of protrusions; and a correction unit to derive one or more correction values based on the detected position of the input device;

wherein one or more first sense areas of the plurality of sense areas extend in a first direction, and one or more second areas of the plurality of sense areas extend in a second direction orthogonal to the first direction.

2. The input device as claimed in claim 1, wherein the detection unit detects a first-directional position of the input device based on contact between the one or more first sense areas and the corresponding protrusions, and a second-directional position of the input device based on contact between the one or more second sense areas and the corresponding protrusions.

3. The input device as claimed in claim 2, wherein the one or more correction values comprise an amount of first-directional misalignment, an amount of second-directional misalignment, and a rotation angle, and the correction unit derives the amount of first-directional misalignment based on a difference between the detected first-directional position and the position of the corresponding protrusion, the amount of second-directional misalignment based on a difference between the detected second-directional position and the position of the corresponding protrusion, and the rotation angle based on a difference between the detected first- and second-directional positions and the positions of the protrusions.

4. The input device as claimed in claim 1, further comprising an information processing unit which, in response to receipt of the one or more correction values from the correction unit, controls a screen displayed on a display coupled to the input device based on the received one or more correction values.

5. A method of correcting misalignment of an input device generating a signal corresponding to a position depressed on an input domain of the input device, wherein the input device is mounted to a casing having a plurality of protru sions and includes a plurality of sense areas to sense contact with the plurality of protrusions, the plurality of sense areas provided around the input domain corresponding to the positions of the plurality of protrusions, the method comprising:

detecting a first-directional position of the input device based on contact between one or more first sense areas of the input device and the corresponding protrusions, the one or more first sense areas extending in a first direction;

detecting a second-directional position of the input device based on contact between one or more second sense areas of the input device end the corresponding protrusions, the one or more second sense areas extending in a second direction orthogonal to the first direction;

deriving an amount of first-directional misalignment based on a difference between the detected first-directional position and the position of the corresponding protrusion;

deriving an amount of second-directional misalignment based on a difference between the detected second-directional position and the position of the corresponding protrusion;

deriving a rotation angle based on a difference between the detected first- and second-directional positions and the positions of the protrusions; and controlling a screen displayed on a display coupled to the input device based on the amount of first-directional misalignment, the amount of second-directional misalignment, and the rotation angle.

* * * * *

UNITED STATES PATENT AND TRADEMARK OFFICE
CERTIFICATE OF CORRECTION

| | | |
|---|---|---|
| PATENT NO. | : 7,106,308 B2 | Page 1 of 1 |
| APPLICATION NO. | : 10/277095 | |
| DATED | : September 12, 2006 | |
| INVENTOR(S) | : Mitsuaki Nakazawa et al. | |

It is certified that error appears in the above-identified patent and that said Letters Patent is hereby corrected as shown below:

Column 13, Line 14, change "end" to --and--.

Signed and Sealed this

Third Day of April, 2007

JON W. DUDAS
*Director of the United States Patent and Trademark Office*